United States Patent
Chang et al.

(10) Patent No.: US 9,853,349 B2
(45) Date of Patent: Dec. 26, 2017

(54) ELECTRONIC DEVICE (71) Applicant: FLYTECH TECHNOLOGY CO., LTD, Taipei (TW)

(72) Inventors: Tsung-Chu Chang, Taipei (TW); Tai-Seng Lam, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 27 days.

(21) Appl. No.: 15/074,509

(22) Filed: Mar. 18, 2016

(65) Prior Publication Data

US 2017/0194693 A1   Jul. 6, 2017

(30) Foreign Application Priority Data

Dec. 31, 2015  (TW) .............................. 104221354 U (51) Int. Cl.
    G06F 3/041    (2006.01)
    G06F 1/16     (2006.01)
    H01Q 1/24     (2006.01)
    H04M 1/18     (2006.01)

(52) U.S. Cl.
    CPC .......... H01Q 1/243 (2013.01); G06F 1/1626 (2013.01); G06F 1/1643 (2013.01); G06F 1/1656 (2013.01); G06F 1/1698 (2013.01); G06F 3/0412 (2013.01); H04M 1/185 (2013.01); *G06F 2203/04103* (2013.01)

(58) Field of Classification Search
    CPC ................. G06F 1/1643; G06F 3/0412; G06F 2203/04103; G06F 1/1626; G06F 1/1656; G06F 1/1696
    See application file for complete search history.

(56) References Cited

U.S. PATENT DOCUMENTS

| | | | |
|---|---|---|---|
| 2007/0057853 A1* | 3/2007 | Chang | H01Q 1/243 343/702 |
| 2013/0162483 A1* | 6/2013 | Park | H01Q 9/14 343/700 MS |
| 2014/0239781 A1* | 8/2014 | Allore | B29C 45/14311 312/223.1 |
| 2015/0122575 A1* | 5/2015 | Park | H04R 1/2811 181/182 |
| 2015/0263416 A1* | 9/2015 | Okano | H01Q 1/36 343/702 |

\* cited by examiner

*Primary Examiner* — Saiful A Siddiqui

(74) *Attorney, Agent, or Firm* — WPAT, PC (57) ABSTRACT

An electronic device includes an operation body, a frame and an antenna. The frame encloses a lateral side of the operation body. The antenna is disposed within the frame, and partially exposed outside the frame. The antenna is electrically connected with the operation body to provide a wireless communication function. A wireless communication interference source is disposed within the operation body, or the operation body contains a metallic material. Since the operation body is enclosed by the frame, the frame can protect operation body and prevent collision of the operation body. Moreover, since the antenna is located outside the operation body, the antenna is away from the interference source that is disposed within the operation body. Consequently, the wireless communication efficiency is enhanced, and the inner space of the operation body is saved.

12 Claims, 7 Drawing Sheets

ELECTRONIC DEVICE

FIELD OF THE INVENTION

The present invention relates to an electronic device, and more particularly to an electronic device with a wireless communication function.

BACKGROUND OF THE INVENTION

With increasing development of science and technology, a variety of electronic devices with communication functions have been introduced into the market. According to the communication forms, electronic devices are classified into wired electronic devices and wireless electronic devices. According to the usage forms, electronic devices are classified into fixed electronic devices and portable (mobile) electronic devices. The portable electronic device (e.g., a tablet computer) has slim appearance similar to the exterior shape of a LCD screen. Consequently, the portable electronic device can be carried easily. Moreover, the screen of the portable electronic device is a touch screen. Through the touch screen, the user may input a command into the portable electronic device to control the operations of the portable electronic device. Generally, when the user intends to input a character or a symbol into the portable electronic device, an on-screen keyboard is enabled and shown on the touch screen of the portable electronic device. The on-screen keyboard is a virtual keyboard simulating the real keyboard device. By touching an icon of the on-screen keyboard, a corresponding character or symbol is inputted into the portable electronic device. In other words, characters or symbols may be directly inputted into the portable electronic device through the on-screen keyboard without the need of using any external keyboard device.

The portable electronic devices that are slim and easily carried have been widely used in daily lives. For example, these portable electronic devices include but are not limited to tablet computers, mobile phones, smart phones, intercoms, notebook computers, navigators and mobile point-of-sale devices.

As mentioned above, the portable electronic device is equipped with the touch screen. However, if the touch screen is damaged, the operations of the portable electronic device fail to be normally handled. That is, it is very important to impart protectiveness to the touch screen. For protecting a protecting function, a protecting case for the portable electronic device is introduced into the market.

Moreover, it is necessary to provide a wireless transmission function to the electronic device. Consequently, an antenna is installed within the electronic device to provide the wireless transmission function such as WLAN, WWAN or GPS. Since many kinds of electronic components are disposed within the electronic device, these electronic components may interfere the antenna and adversely affect the performance of the antenna. Consequently, in addition to the protecting function, it is important to increase the operation efficiency of the antenna of the electronic device.

SUMMARY OF THE INVENTION

For solving the drawbacks of the conventional technologies, the present invention provides an electronic device with a protecting function. Moreover, an antenna of the electronic device has enhanced operation efficiency.

In accordance with an aspect of the present invention, there is provided an electronic device. The electronic device includes an operation body, a frame and an antenna. The frame encloses a lateral side of the operation body. The antenna is disposed within the frame and partially exposed outside the frame. The antenna is electrically connected with the operation body so as to provide a wireless communication function. A wireless communication interference source is disposed within the operation body, or the operation body contains a metallic material.

In an embodiment, the operation body includes a touch screen and a rear cover. An operation picture is shown on the touch screen. Via the touch screen, a touch command is inputted into the electronic device in a touch control manner. The rear cover partially covers the touch screen. The rear cover includes a coupling structure corresponding to the frame.

In an embodiment, a shape of the coupling structure is complementary to a portion of the frame, so that the coupling structure is engaged with the frame.

In an embodiment, the operation body further includes a connector. The connector is located inside the rear cover and electrically connected with the touch screen. The connector is partially protruded out of the rear cover and electrically connected with the antenna.

In an embodiment, the connector includes an elastic pin, a circuit board and a connecting wire. The elastic pin is protruded out of the rear cover, and electrically connected with the antenna. The circuit board is located inside the rear cover, and electrically connected with the elastic pin. The connecting wire is electrically connected with the circuit board and the touch screen. An electric connection between the elastic pin and the touch screen is established through the connecting wire.

In an embodiment, the connector is a connecting wire.

In an embodiment, the rear cover is made of a plastic material or a metallic material.

In an embodiment, the frame is made of an insulating collision-resistant material.

In an embodiment, the antenna is installed within the frame by an insert molding process.

In an embodiment, the frame further includes a receiving recess. The receiving recess is located inside the frame. The antenna is accommodated within the receiving recess.

In an embodiment, the antenna is fixed on an inner surface of the frame by an adhering means, an adsorbing means, a screwing means or a riveting means.

In an embodiment, the antenna is fixed on an inner surface of the frame, and partially protruded from the frame.

From the above descriptions, the present invention provides the electronic device. For protecting the operation body, the frame is located at the lateral side of the rear cover to enclose the lateral side of the rear cover and provide the protecting function. Once the electronic device falls down to the floor or a rigid object, the impact force is absorbed by the frame and thus the possibility of damaging the electronic device is largely reduced. The frame is made of a soft material. On the other hand, the antenna is disposed within the frame. That is, the antenna is located outside the operation body. More especially, the antenna is away from the wireless communication interference source that is disposed within the operation body. Consequently, the inner space of the operation body is saved, and the wireless communication efficiency of the antenna is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides an electronic device.

Figure 1:
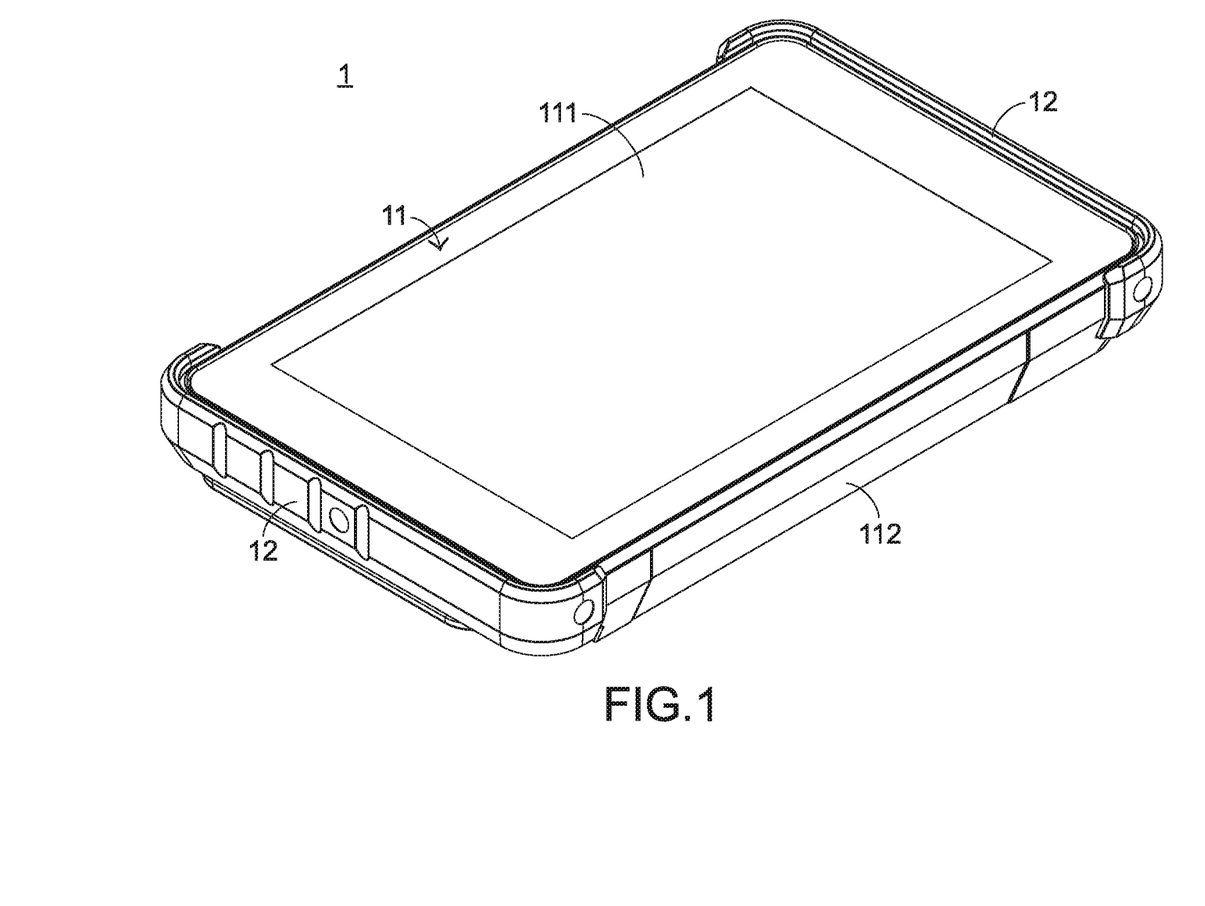
FIG. 1 is a schematic perspective view illustrating the outer appearance of an electronic device according to a first embodiment of the present invention.
Figure 2:
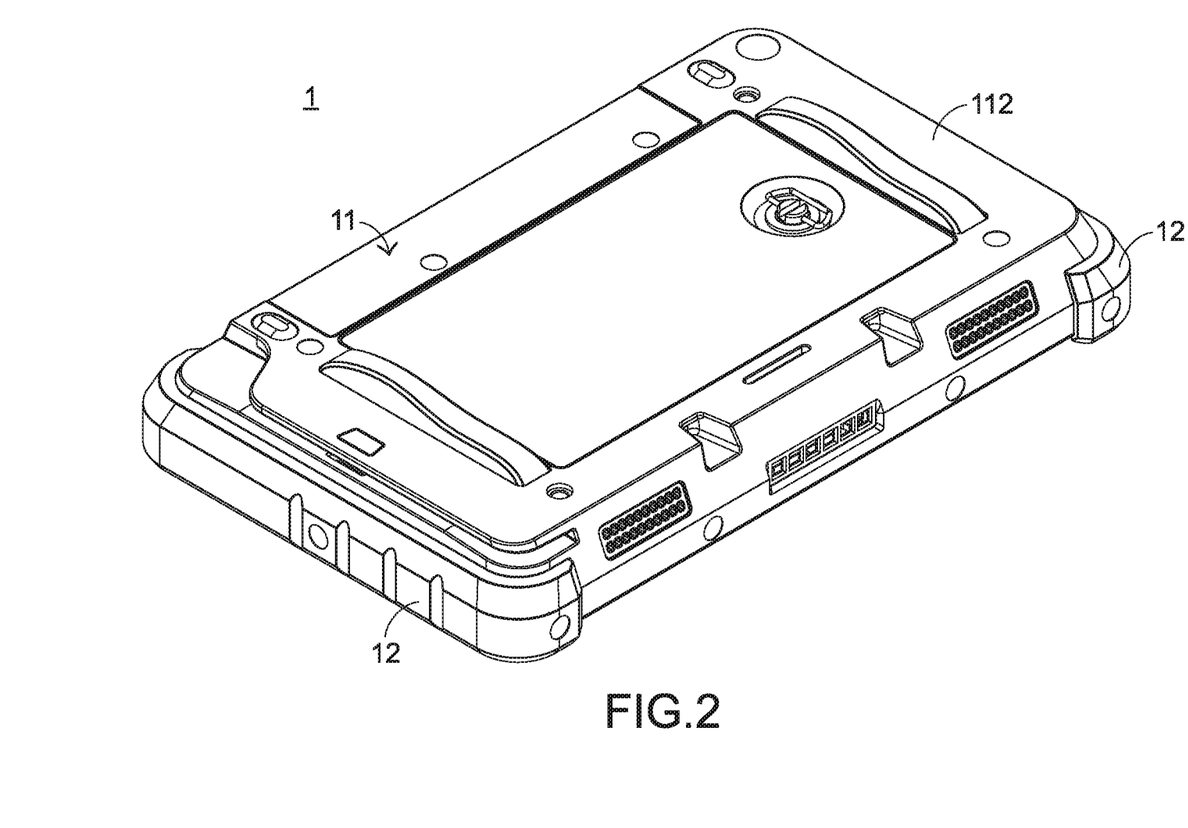
FIG. 2 is a schematic perspective view illustrating the electronic device of FIG. 1 and taken along another viewpoint.

Please refer to FIGS. 1 and 2. FIG. 1 is a schematic perspective view illustrating the outer appearance of an electronic device according to a first embodiment of the present invention. FIG. 2 is a schematic perspective view illustrating the electronic device of FIG. 1 and taken along another viewpoint. The electronic device 1 comprises an operation body 11, plural frames 12 and an antenna 13 (see FIG. 3). An operation picture can be shown on the operation body 11. The plural frames 12 enclose corresponding lateral sides of the operation body 11 in order to protect the operation body 11. Moreover, the operation body 11 comprises a touch screen 111 and a rear cover 112. An operation picture is shown on the touch screen 111. Via the touch screen 111, the user can input touch commands into the electronic device 1 in a touch control manner. Moreover, the touch screen 111 is covered by the rear cover 112. In an embodiment, the electronic device 1 is a tablet computer, and the rear cover 112 is made of a hard plastic material. It is noted that the type of the material of the rear cover 112 is not restricted. For example, in another embodiment, the rear cover is made of a metallic material.

Figure 3:
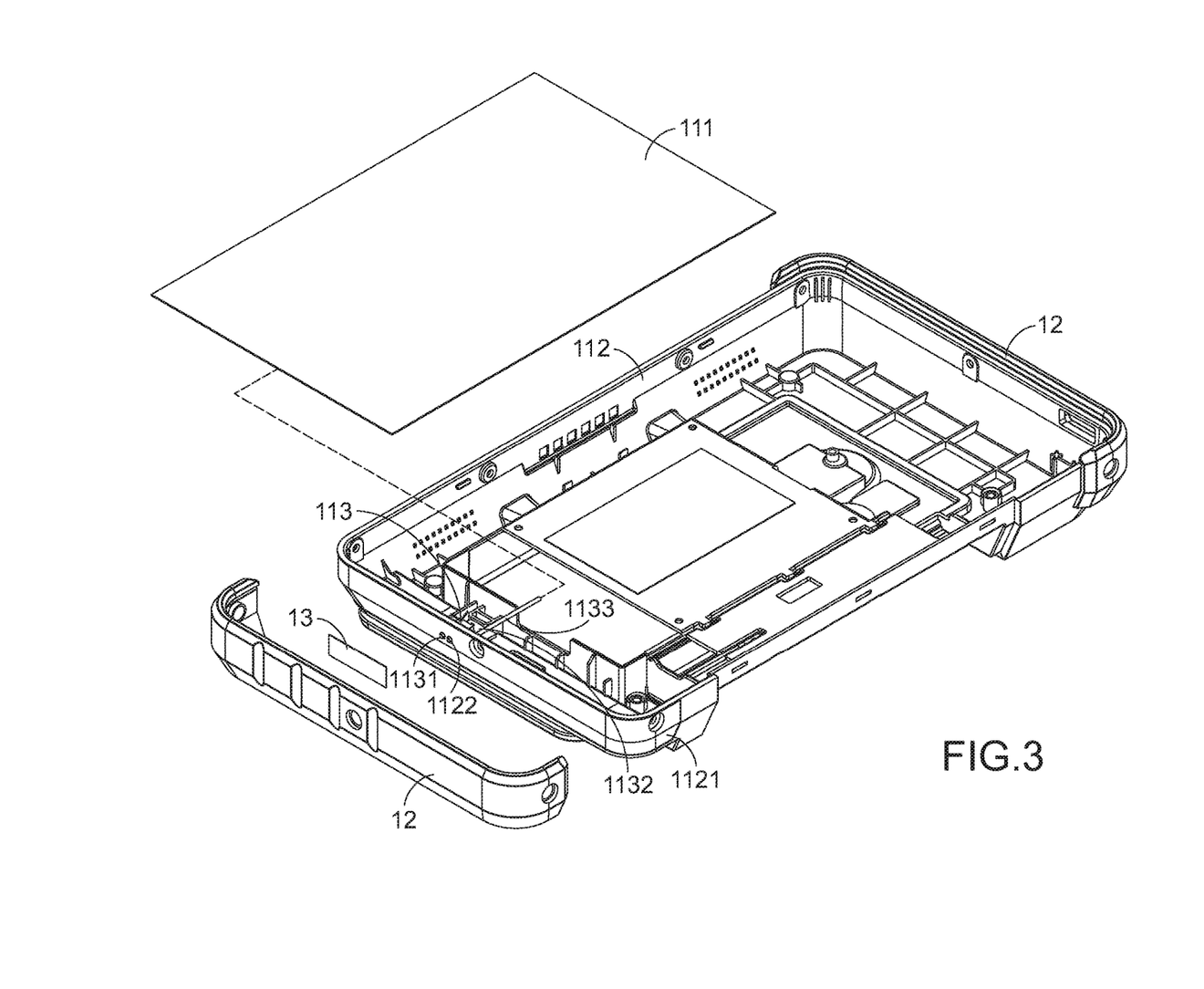
FIG. 3 is a schematic exploded view illustrating a portion of the electronic device according to the first embodiment of the present invention.
Figure 4:
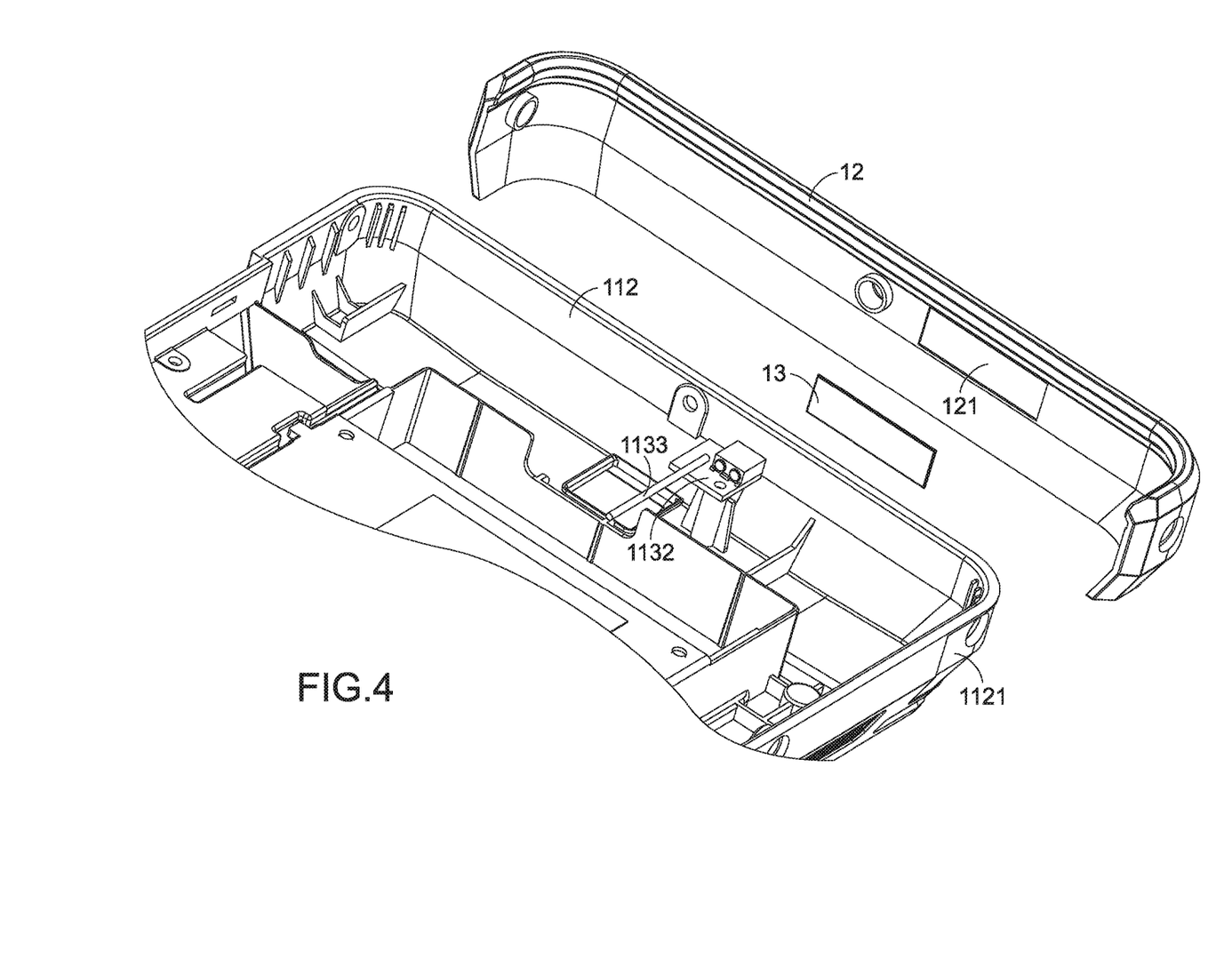
FIG. 4 is a schematic exploded view illustrating the electronic device of FIG. 3 and taken along another viewpoint.

Please refer to FIGS. 3 and 4. FIG. 3 is a schematic exploded view illustrating a portion of the electronic device according to the first embodiment of the present invention. FIG. 4 is a schematic exploded view illustrating the electronic device of FIG. 3 and taken along another viewpoint. The antenna 13 is disposed within one frame 12 and partially exposed outside the frame 12. The antenna 13 is electrically connected with the touch screen 111 of the operation body 11 in order to provide a wireless communication function. The rear cover 112 comprises plural coupling structures 1121 corresponding to the frames 12. Each coupling structure 1121 is located at a lateral side of the rear cover 112. The shape of the coupling structure 1121 is complementary to a portion of an inner surface of the corresponding frame 12. Consequently, the coupling structure 1121 is engaged with the corresponding frame 12. In an embodiment, the antenna 13 has a sheet-like shape, the frame 12 is made of an insulating collision-resistant material or a soft material (e.g., rubber), and the coupling structure 1121 is a concave structure. It is noted that numerous modifications and alterations may be made while retaining the teachings of the invention. For example, in another embodiment, the coupling structure is formed on the frame, and the shape of the coupling structure is complementary to the corresponding lateral side of the rear cover. Moreover, the insulating collision-resistant material is not restricted to a hard material or a soft material (e.g., rubber). Preferably but not exclusively, the frame 12 is made of rubber. In practice, the frame 12 may be made of a hard material or a soft material as long as the frame 12 is able to provide the protecting and insulating functions.

Please refer to FIG. 3 again. The operation body 11 further comprises a connector 113. The connector 113 is located inside the rear cover 112, and electrically connected with the touch screen 111. The connector 113 is partially protruded out of the rear cover 112 so as to be electrically connected with the antenna 13. In this embodiment, the connector 113 comprises an elastic pin 1131, a circuit board 1132 and a connecting wire 1133. The elastic pin 1131 is penetrated through an opening 1122 of the rear cover 112 and thus protruded out of the rear cover 112. Moreover, the elastic pin 1131 is electrically connected with the circuit board 1132. The elastic pin 1131 is also electrically connected with the antenna 13. The circuit board 1132 is located inside the rear cover 112, and electrically connected with the elastic pin 1131. The connecting wire 1133 is electrically connected with the circuit board 1132 and the touch screen 111. Through the connecting wire 1133, the elastic connection between the elastic pin 1131 and the touch screen 111 is established. In an embodiment, the elastic pin 1131 is a Pogo pin.

Figure 5:
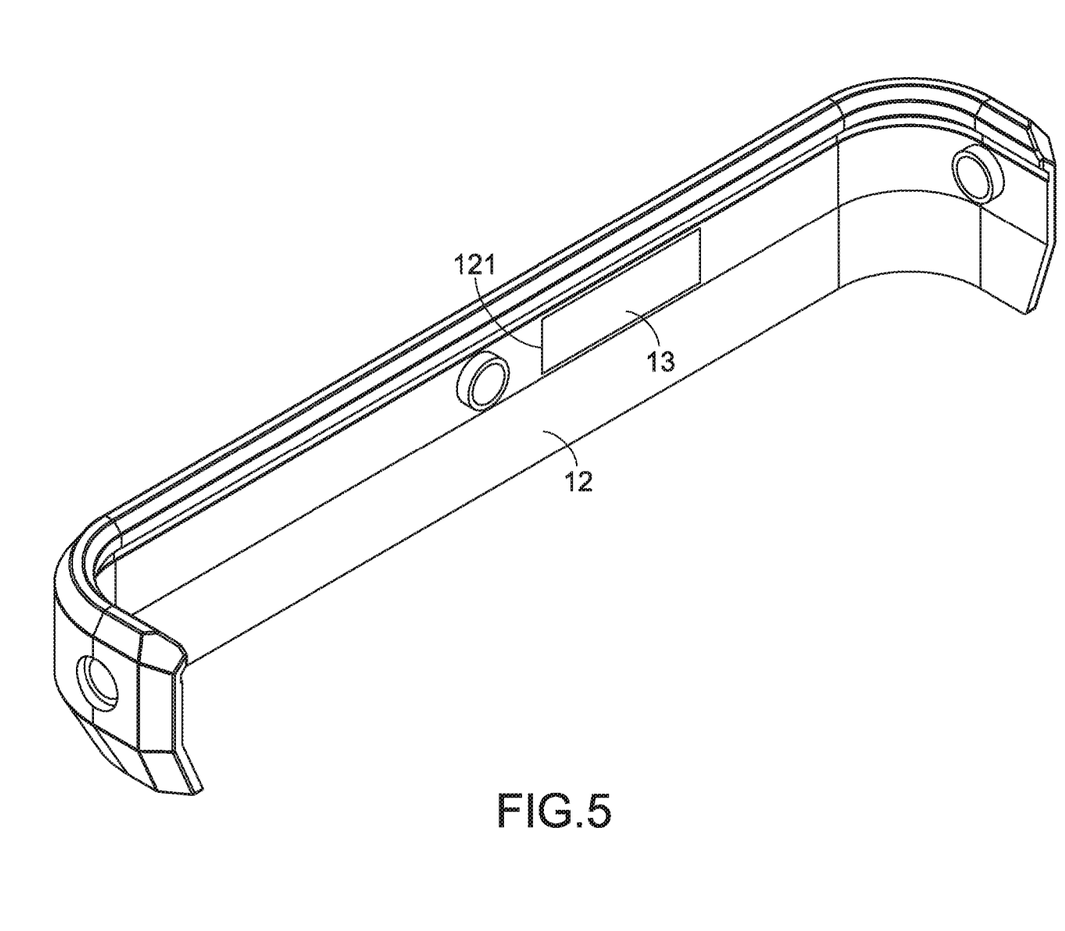
FIG. 5 schematically illustrates the connection between the antenna and the frame of the electronic device according to the first embodiment of the present invention.

The structure inside the frame 12 is shown in FIG. 4. As shown in FIG. 4, the frame 12 comprises a receiving recess 121. The receiving recess 121 is located inside the frame 12 for accommodating the antenna 13. After the antenna 13 is accommodated within the receiving recess 121, the antenna 13 is coupled with the frame 12 (see FIG. 5). It is noted that the way of connecting the antenna and the frame is not restricted. For example, in some embodiments, the antenna is fixed on an inner surface of the frame by an adhering means, an adsorbing means, a screwing means, a riveting means or any other appropriate connecting means. In some other embodiments, the antenna is fixed in the receiving recess by any two of the adhering means, the adsorbing means, the screwing means and the riveting means. Consequently, the connection between the antenna and the frame is more secure.

The following three aspects should be specially described. Firstly, a process of assembling the electronic device 1 will be illustrated as follows. The connector 113 is firstly placed inside the rear cover 112 and electrically connected with the touch screen 111, and the elastic pin 1131 of the connector 113 is protruded out of the lateral side of the rear cover 112. After the antenna 13 is electrically connected with the connector 113, the antenna 13 is coupled with the frame 12. Afterwards, the frame 12 is coupled with the lateral side of the rear cover 112. In another process of assembling the electronic device 1, the installation of the connector 113 is first completed, and the antenna 13 is electrically connected with the connector 113 after the antenna 13 is coupled with the frame 12.

Secondly, each frame 12 is not restricted to enclose only one lateral side of the rear cover 112. That is, the frame 12 can enclose at least one lateral side of the rear cover 112. In an embodiment, the frame 12 is a U-shaped frame that completely encloses a shorter side of the rear cover 112 and partially encloses two longer sides of the rear cover 112.

Thirdly, the electronic device 1 is applied to a vehicle navigation device or a point-of-sale device.

Figure 6:
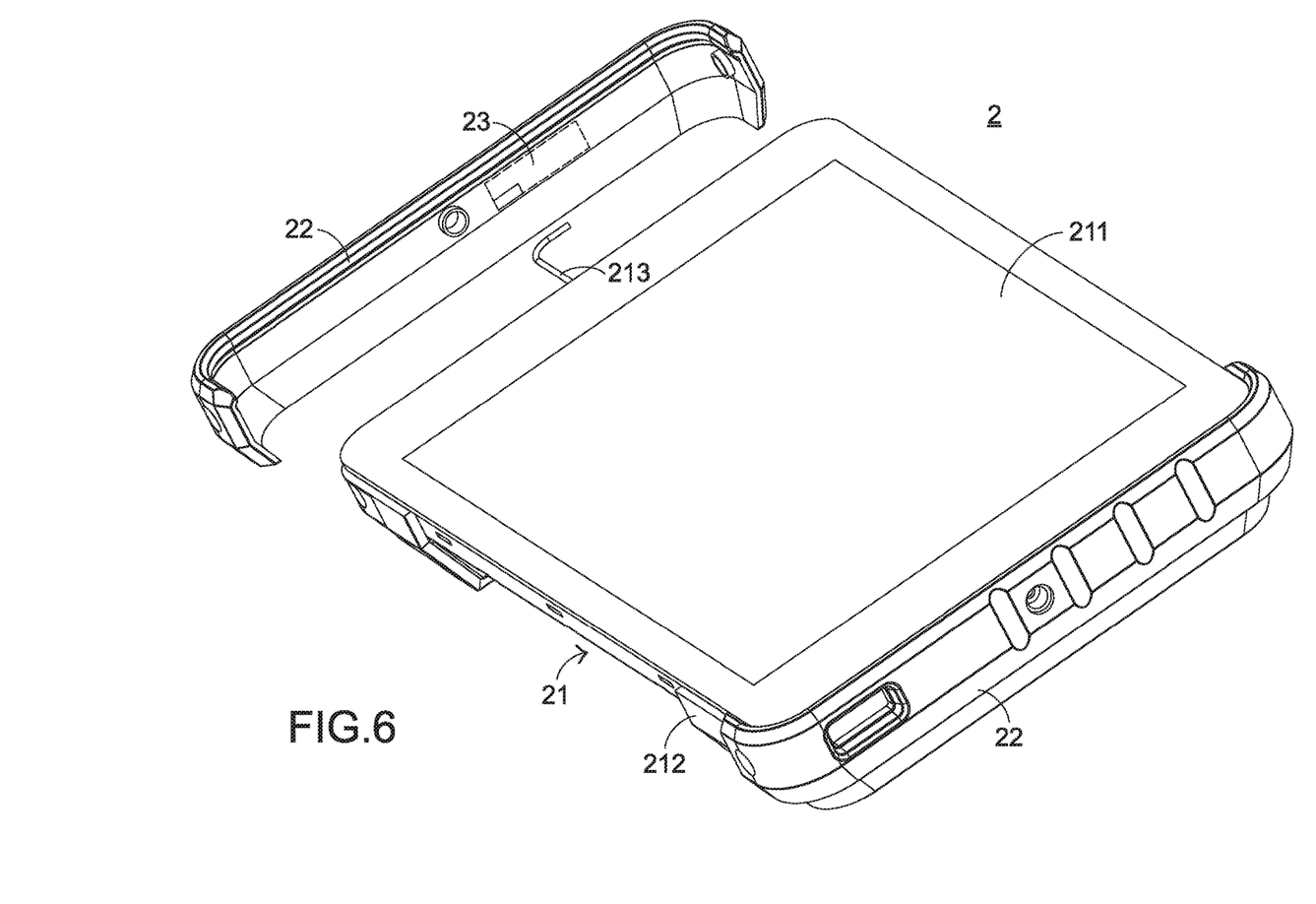
FIG. 6 is a schematic exploded view illustrating a portion of an electronic device according to a second embodiment of the present invention.
Figure 7:
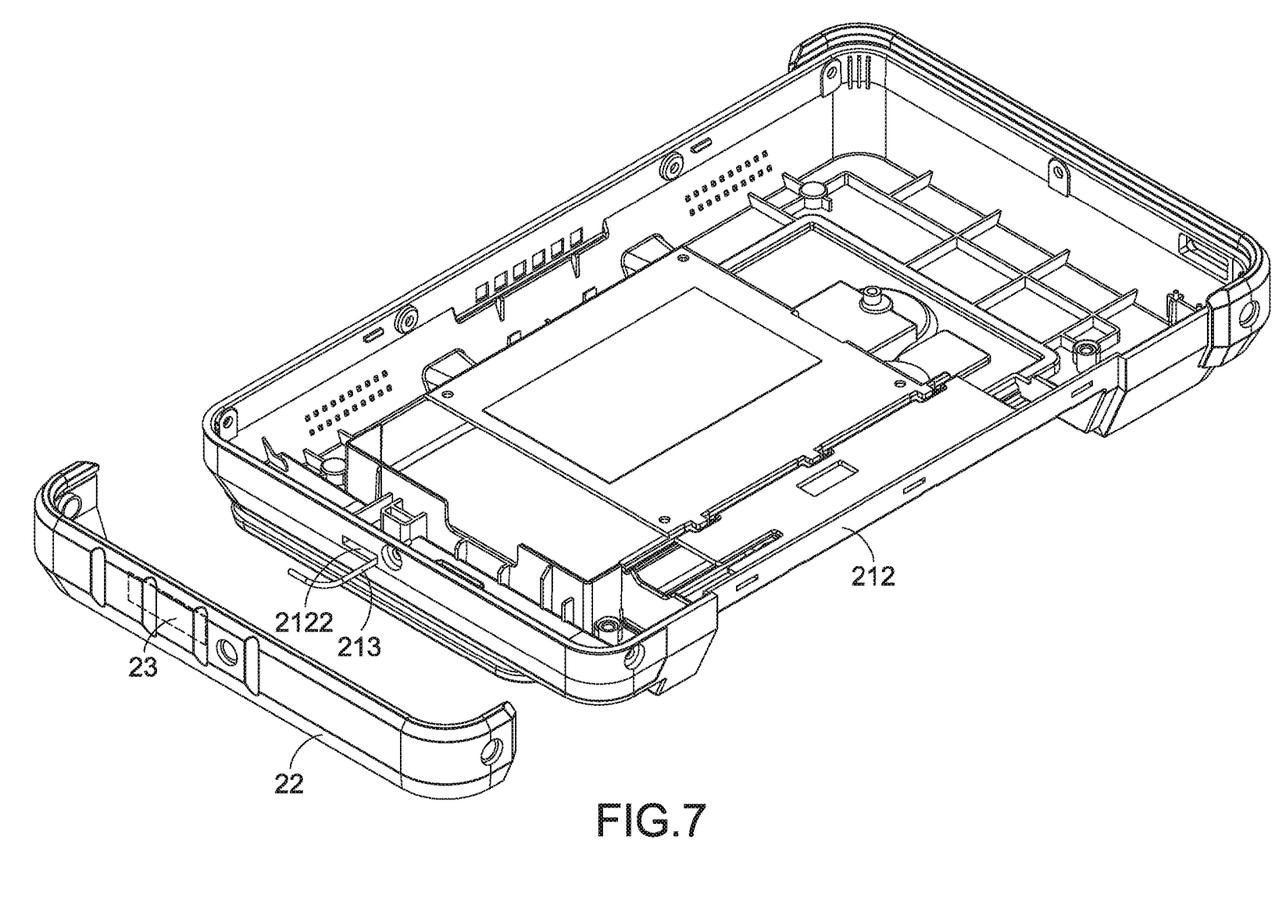
FIG. 7 is a schematic exploded view illustrating the electronic device of FIG. 6 and taken along another viewpoint.

The present invention further provides an electronic device of a second embodiment, which is distinguished from the first embodiment. FIG. 6 is a schematic exploded view illustrating a portion of an electronic device according to a second embodiment of the present invention. FIG. 7 is a schematic exploded view illustrating the electronic device of FIG. 6 and taken along another viewpoint. Please refer to FIGS. 6 and 7. The electronic device 2 comprises an operation body 21, plural frames 22 and an antenna 23. The operation body 21 comprises a touch screen 211, a rear cover 212 and a connector 213. The components of the electronic device 2 that are similar to those of the electronic device 1 of the first embodiment are not redundantly described herein. In comparison with the first embodiment, the structure of the connector 213 and the way of connecting the antenna 23 and the frame 22 are distinguished.

As shown in FIGS. 6 and 7, the connector 213 is a connecting wire. The connector 213 is located inside the rear cover 212 and electrically connected with the touch screen 211. Moreover, the connector 213 is penetrated through an opening 2122 of the rear cover 212 and thus protruded out of the rear cover 212. Consequently, the connector 213 is electrically connected with the antenna 23, which is disposed within the frame 22.

In this embodiment, the antenna 23 is installed within the frame 22 by an insert molding process, and the antenna is partially exposed to an inner surface of the frame 22. Consequently, the connector 213 is electrically connected with the exposed part of the antenna 23. In FIG. 6, the exposed part of the antenna 23 is indicated by solid lines, and the part of the antenna inserted in the frame 22 is indicated by dotted lines. For assembling the electronic device 2, the connector 213 is placed inside the rear cover 212 and electrically connected with the touch screen 211, and the connector 213 is protruded out of the lateral side of the rear cover 212. Moreover, the antenna 23 is installed within the frame 22 by the insert molding process. After the electric connection between the antenna 23 and the connector 213, the frame 12 is coupled with the lateral side of the rear cover 212.

From the above descriptions, the present invention provides the electronic device. For protecting the touch screen, a frame made of a soft material (e.g., rubber) is located at the lateral side of the rear cover to enclose the lateral side of the rear cover and provide the protecting function. Once the electronic device falls down to the floor or a rigid object, the impact force is absorbed by the frame and thus the possibility of damaging the electronic device is largely reduced. On the other hand, the antenna is disposed within the frame. That is, the antenna is located outside the operation body. Consequently, even if the operation body contains a metallic material, the signal shielding problem or the signal interference problem can be overcome. More especially, the antenna is away from the wireless communication interference source that is disposed within the operation body (e.g., a circuit or a chip). Under this circumstance, the antenna in the frame is considered as an external antenna away from the operation body.

Since the antenna is located outside the operation body, the electronic device of the present invention has the following advantages. Firstly, the outer appearance of the electronic device can be designed according to the practical requirements, and the operation body of the electronic device can be effectively protected. Secondly, the inner space of the operation body is saved. Consequently, the inner space of the operation body can be effectively utilized, and the volume of the operation body can be further reduced. Thirdly, the antenna is away from the interference source within the operation body. Consequently, the signal interference problem is solved, and the wireless communication efficiency of the antenna is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
   an operation body, comprising:
      a main device;
      a rear cover for covering the main device; and
      a connector electrically connected to the main device, and enclosed by but partially exposed from the rear cover;
   a frame coupled to the rear cover and enclosing a lateral side of the rear cover; and
   an antenna accommodated in the frame at a position corresponding to a position of the connector when the frame is coupled to the rear cover, and partially exposed from the frame for being electrically connected with the connector of the operation body through the rear cover, thereby keeping the antenna away from a wireless communication interference source.

2. The electronic device according to claim 1, wherein:
   the main device is a touch screen showing an operation picture, wherein via the touch screen, a touch command is inputted into the electronic device in a touch control manner; and
   the rear cover partially covers the touch screen, and comprises a coupling structure engaged with the frame.

3. The electronic device according to claim 2, wherein a shape of the coupling structure is complementary to a portion of the frame, where the coupling structure is engaged with the frame.

4. The electronic device according to claim 1, wherein the connector is partially protruded out of the rear cover and electrically connected with the antenna.

5. The electronic device according to claim 2, wherein the connector comprises:
   an elastic pin resiliently protruding from the rear cover, and electrically connected with the antenna when the frame is coupled to the rear cover;
   a circuit board located inside the rear cover, and electrically connected with the elastic pin; and
   a connecting wire electrically connected with the circuit board and the touch screen, wherein an electric connection between the elastic pin and the touch screen is established through the connecting wire.

6. The electronic device according to claim 1, wherein the connector is a connecting wire.

7. The electronic device according to claim 1, wherein the rear cover is made of a plastic material or a metallic material.

8. The electronic device according to claim 1, wherein the frame is made of an insulating collision-resistant material.

9. The electronic device according to claim 1, wherein the antenna is installed within the frame by an insert molding process.

10. The electronic device according to claim 1, wherein the frame further comprises a receiving recess, wherein the receiving recess is located inside the frame, and the antenna is accommodated within the receiving recess.

11. The electronic device according to claim 1, wherein the antenna is fixed on an inner surface of the frame by an adhering means, an adsorbing means, a screwing means or a riveting means.

12. The electronic device according to claim 1, wherein the antenna is fixed on an inner surface of the frame, and partially protruded from the frame.

* * * * *